United States Patent [19]
Fox et al.

[11] 3,864,507
[45] Feb. 4, 1975

[54] ELECTRICAL CONDUCTOR

[75] Inventors: D. Marshall Fox, Highton, Victoria, Australia; Richard B. Weiss, Lower Burrell, Pa.

[73] Assignee: Aluminum Company of America, Pittsburgh, Pa.

[22] Filed: Feb. 25, 1974

[21] Appl. No.: 445,543

[52] U.S. Cl. ............... 174/14 R, 174/16 B, 174/28
[51] Int. Cl. ............................................. H01b 9/06
[58] Field of Search ........... 138/156, 157, 158, 166, 138/165, 171, 108; 174/16 B, 10, 15 C, 28, 29, 17 GF, 25 G, 27, 14 R, 99 B

[56] References Cited
UNITED STATES PATENTS

| | | | |
|---|---|---|---|
| 755,436 | 3/1904 | Bentel | 138/171 X |
| 3,324,272 | 6/1967 | Shankle et al. | 174/28 X |
| 3,345,450 | 10/1967 | Spindle | 174/28 |
| 3,515,939 | 6/1970 | Trump | 174/14 |
| 3,767,837 | 10/1973 | Graybill | 174/27 |
| 3,792,188 | 2/1974 | Cronin | 174/28 X |

*Primary Examiner*—Arthur T. Grimley
*Attorney, Agent, or Firm*—David W. Brownlee

[57] ABSTRACT

An electrical conductor assembly particularly adapted for underground transmission of high voltage direct current is provided which includes a hollow, cylindrical metal sheath made of elongate staves having tongue and groove engagement between the longitudinal edges of adjacent staves and welded together exteriorly of such tongue and groove engagements and having a groove in the bottom of the sheath in the interior surface thereof to collect particles of foreign matter in the sheath. The conductor further includes a solid cylindrical conductor core of metal such as an aluminum conductor alloy concentrically supported in the sheath by a plurality of insulators at spaced intervals along the length of the conductor and has a compressed gas in the sheath for insulating the aluminum core from the sheath.

9 Claims, 4 Drawing Figures

3,864,507

ELECTRICAL CONDUCTOR

BACKGROUND OF THE INVENTION

1. Field of the Invention

This invention relates to an electrical conductor, and in particular to a compressed gas-insulated conductor for an underground transmission line for high voltage direct current electrical power.

2. Brief Description of the Prior Art

Underground electrical transmission lines are being used on an ever-increasing scale in recent years due to the desirability of avoiding unsightly overhead lines, greater safety in underground lines, problems in obtaining right-of-way for overhead lines, and higher power loads required by the growing metropolitan areas and growing demands for electrical energy. Underground compressed gas-insulated transmission lines are disclosed in U.S. Pat. Nos. 2,216,010, 2,221,671, 3,356,785, 3,448,202 and 3,730,965 among others. Compressed gas-insulated transmission lines typically comprise a hollow sheath, a conductor in the sheath, a plurality of insulators which support the conductor centered in the sheath and compressed gas such as sulfur hexafluoride or the like in the sheath to insulate the conductor from the sheath. The typical conductor assembly has been fabricated from relatively short sections of hollow cylindrical ducts or tubes in which the conductor and insulator are inserted. This assembly is usually completed in the factory, and the sections welded or otherwise secured together in the field to form a transmission line. Gas barriers are provided at intervals along the length of the assembly, and an insulating gas is forced into the sheath under pressure. It is also known to provide a particle trap in compressed gas-insulated transmission lines as is disclosed in U.S. Pat. No. 3,515,939. The particle trap is used to precipitate out of the insulating gas particles of foreign matter which could adversely affect the breakdown voltage of the dielectric.

Many of the compressed gas insulated transmission lines have been designed to carry alternating current, but some such lines have also been designed to carry direct current. The technical advantages of direct current transmission, whether overhead or underground, have been well documented by practical operating experience in the United States and abroad. Large amounts of power can be moved with minimal effect on the stability of the interconnected AC systems, and the amount and direction of power flow can be controlled with ease. With DC power transmission within an AC network there is no significant increase in system short-circuit capacity asynchronous power transfer is possible and surge levels are low allowing for significant insulation savings. There is also no line or cable charging current for DC power transmission, which thus avoids the need for series or shunt compensation. In a bipolar system, high single-circuit reliability may be achieved by the practicality of emergency monopolar operation using the conducting sheath as a return conductor, an option which is not available with three phase AC transmission. DC lines also occupy less right-of-way for a given capacity.

The DC potential imposes less stress on the insulation and eliminates problems posed by electromagnetic induction and charging currents. Electrical losses for a given conductor cross-section are lower for DC than for AC because only $I^2R$ losses are involved. Less insulation is required for a given voltage, resulting in a system with reduced overall diameter. The full cross-section of a cylindrical conductor can be utilized with DC because there is no skin effect. Sheath losses in a DC system are also practically non-existent. Since a DC transmission line produces little power loss and resulting heat, a DC line can function well without the need for artificial cooling as is frequently required for high voltage alternating current transmission lines.

A conductor assembly for underground transmission lines for high voltage direct current is desired which will take advantage of the characteristics of direct current and of a solid conductor. Such a DC conductor is desired which can be laid in the ground by practical methods and apparatus.

SUMMARY OF THE INVENTION

This invention provides a conductor for an electrical transmission line comprising a gas-tight hollow cylindrical sheath made of a plurality of elongate staves each of which comprises a portion of the circumference of the sheath and having tongue-in-groove engagement between the longitudinal edges of the staves and welded together exteriorly of said tongue-in-groove engagement. A core conductor is provided in the sheath, a plurality of insulators support the core conductor centered in the sheath at spaced intervals along its length and compressed gas in the sheath insulates the core conductor from the sheath. The invention also provides a particle trap in the sheath in the form of a groove along the bottom of the sheath in its interior surface with the groove having a mouth which is substantially narrower than is the bottom of the groove to trap foreign particles in the groove.

A purpose of this invention is to provide a high voltage conductor assembly which can be assembled and laid in the ground in the field by commercially practical methods and apparatus.

Another object of this invention is to provide a conductor for a high voltage electrical transmission line in which the hollow sheath comprises a plurality of staves which can be assembled and welded around a core conductor and insulators to facilitate fabricating the conductor and laying it in the ground.

A further object of this invention is to provide a hollow sheath for an electrical conductor comprising a plurality of staves having longitudinally extending joint means therebetween which are adapted to be welded together without products of the welding operation entering the interior of the sheath.

Another object of this invention is to provide a conductor for a high voltage electrical transmission line which includes means for trapping foreign particles in the hollow sheath to avoid reductions in the breakdown voltage which can result from the existence of such particles in the insulating gas.

A further object of this invention is to provide a conductor for high voltage electrical transmission lines which takes advantage of the lower cost of a direct-cast or otherwise fabricated conductor and the characteristics of direct current power.

Another object of this invention is to provide a conductor for high voltage direct current transmission lines in which a sheath of low electrical resistance allows emergency monopolar operation and enhances safety in the event of accidental damage to the conductor.

DESCRIPTION OF A PREFERRED EMBODIMENT

Figure 1:
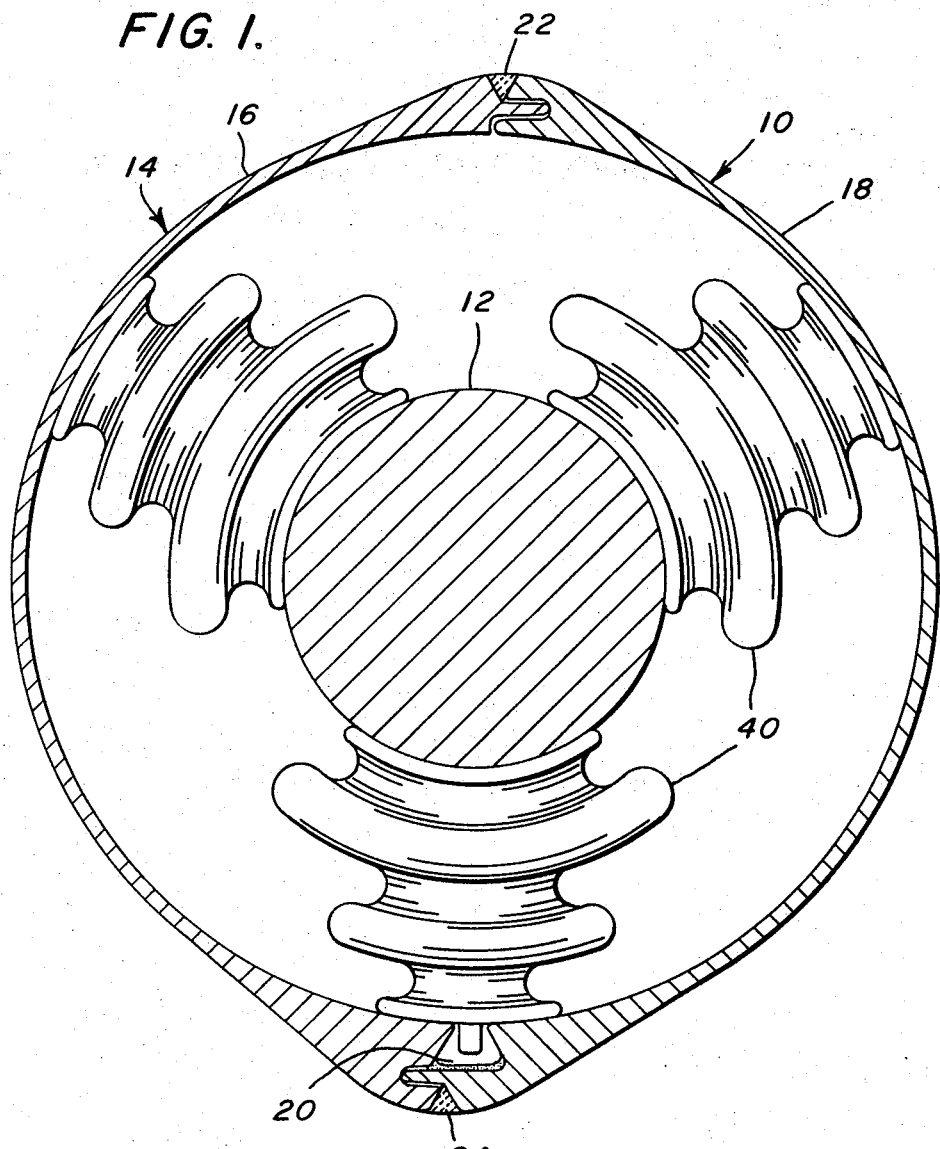
FIG. 1 is a cross section through a conductor assembly of the invention.
Figure 2:
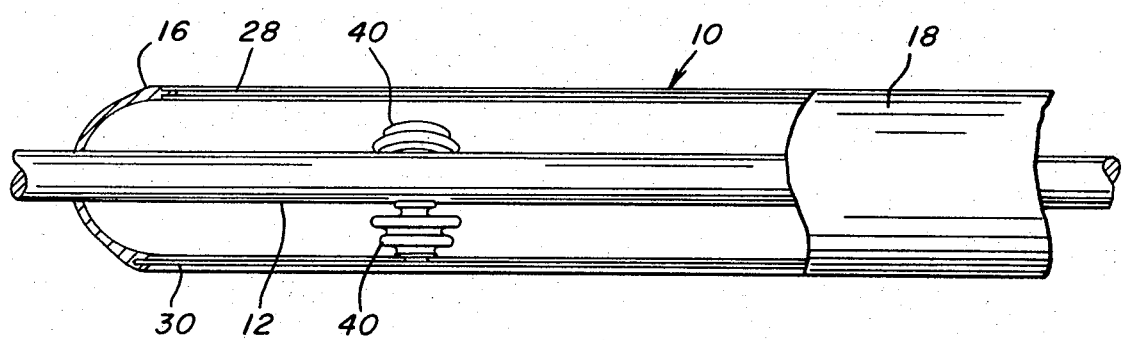
FIG. 2 is a side view of a conductor assembly of the invention showing one side of the hollow sheath partially removed.
Figure 3:
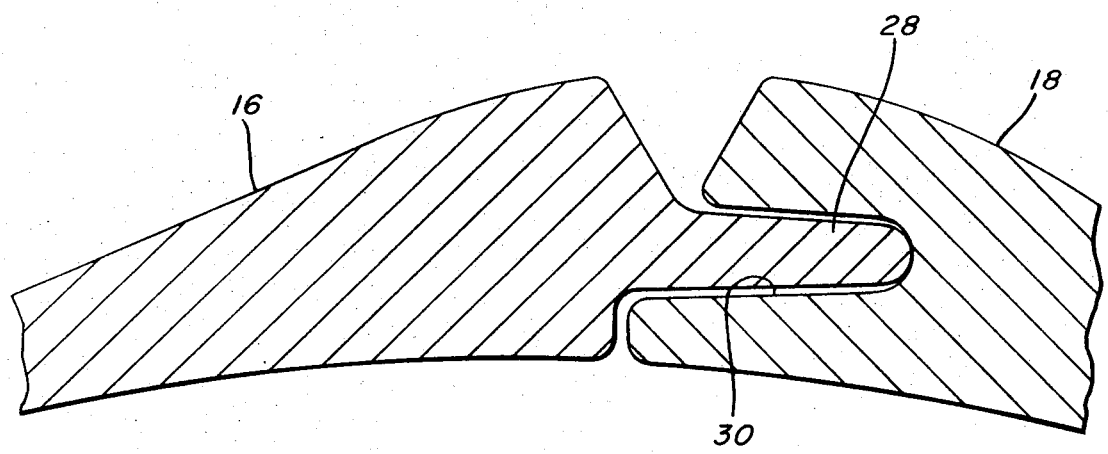
FIG. 3 is an enlarged cross section through the top joint of the sheath of FIG. 1 prior to welding.
Figure 4:
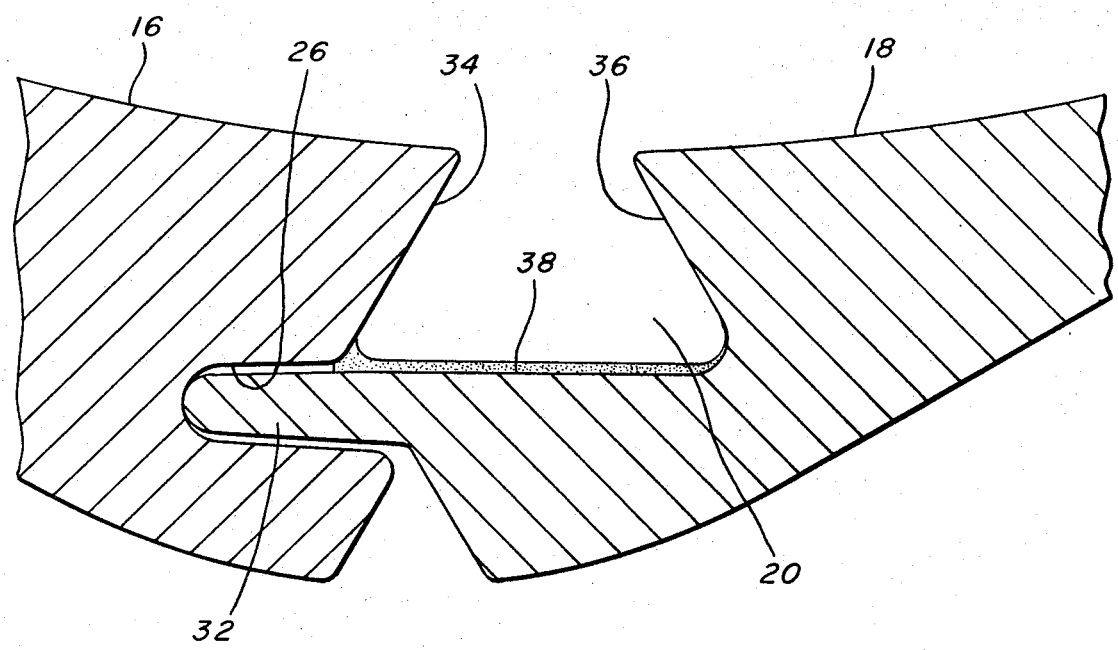
FIG. 4 is an enlarged cross section through the bottom joint of the sheath of FIG. 1 prior to welding.

Referring to the figures, a conductor assembly 10 is illustrated which includes a solid core conductor 12 which is preferably made of an aluminum conductor alloy and especially adapted for transmission of high voltage direct current. Core conductor 12 may be formed by direct casting of the aluminum conductor alloy and may have a dielectric coating on its surface to increase the dielectric characteristics of the system and insure a high breakdown voltage for the system. The diameter of core conductor 12 will vary depending on the power to be carried by the conductor, and for example may have approximately a 3 and ½ inch diameter for a transmission line rating of 400 kilovolts and 2,000 amperes. A conductor of this size and capability is estimated to have a power loss of approximately 5½ watts per linear foot at 2,000 amperes with an estimated conductor temperature rise of about 10°C. With such low power losses, the need for thermal backfill or artificial cooling is virtually eliminated.

A hollow sheath 14, preferably made of an aluminum alloy, encloses conductor 12 along its length. Sheath 14 comprises two elongate staves 16 and 18 each of which forms a portion of the circumference of the cylindrical sheath. Staves 16 and 18 are preferably extruded from aluminum, but they may be made of other materials and by other methods. The staves 16, 18 have longitudinally extending tongue and groove engagement along their edges with welds 22 and 24 exterior of the tongue and groove engagement. The tongue and groove engagement serves as an alignment means between the two halves of the sheath and also serves as a barrier to prevent weld splatter from entering the conductor system when the two halves are joined.

Preferably, the sheath 14 is made of conducting material so it will remain at zero (earth) potential when the conductor is energized, to provide a region of low voltage gradient within the particle trap 20 at the bottom of the sheath. Although this action could be provided by a thin conductive layer on the interior of the sheath, it is preferable that the longitudinal resistance of the sheath be of the same order of magnitude as that of the central conductor, so the sheath may conduct current without overheating during emergency monopolar operation. Furthermore safety codes generally require a low resistance sheath so that in the event of accidental perforation of the sheath by subsequent digging operations, damage to the conductor and shock hazards are minimized by fast operation of circuit breakers, triggered by the large fault current made possible by a low-resistance sheath. A sheath conductance in a range of approximately one to one-fifth of the core conductance is preferred for a conductor assembly constructed in accordance with this invention. The lower limit of approximately one-fifth of the core conductance is believed to be adequate in view of the limited need for emergency monopolar operation, and also because the sheath will be in contact with the soil which will remove from the sheath heat produced by a sheath resistance greater than the electrical resistance of the core conductor.

As previously stated, most compressed gas-insulated conductor assemblies have heretofore included cylindrical tubes or ducts in which the conductor core and insulators must be telescoped to form a conductor assembly. Such conductor assemblies have posed problems in assembly of long lengths of the conductor involving positioning of insulator spacers within the sheath. The present invention facilitates fabrication of a conductor system because it avoids the need to telescope a conductor and insulators into a tubular sheath as has heretofore been required.

In the conductor assembly 10 which has been selected for illustration, the lefthand stave 16 has a groove 26 along its bottom longitudinal edge which is open toward the adjoining edge of the adjacent stave 18, and has a tongue 28 along its upper marginal edge projecting toward and into the groove on the adjoining edge of the adjacent stave 18. Stave 18 has a groove 30 along its upper marginal edge open toward tongue 28 on stave 16 and has a tongue 32 along its bottom marginal edge projecting toward and into groove 26 on stave 16. Staves 16 and 18 further have upwardly converging bottom marginal edges 34 and 36 which cooperate with upwardly facing surface 38 on stave 18 to form a particle trap 20 in the bottom of sheath 14. The particle trap 20 is preferably substantially trapezoidal in cross-section with the mouth of the trap being approximately one-half the width of the base of the trap.

Conductor assembly 10 further includes a plurality of insulator spacers 40 positioned between conductor core 12 and sheath 14 at intervals of approximately 10 to 20 feet along the length of the conductor assembly depending on the size of the core conductor 12. A solid aluminum core conductor 3½ inches in diameter will weigh approximately 11.5 pounds per linear foot, and the insulator spacers should not be required to support much more than 150 pounds of core conductors. Spacers 40 may be made of ceramic or acrylic material and may have ribbed or corrugated surfaces. It is believed that ribbed surfaces on the spacers provide a maximum surface length between the conductor 12 and sheath 14 which may be beneficial to achieving a relatively high breakdown voltage for the conductor assembly. It is desirable to provide a pad of semi-conducting material between spacers 40 and conductor 12 in order to have proper voltage gradient between the conductor and insulator.

Conductor assembly 10 is filled with an electronegative gas such as sulfur hexafluoride (SF6) or a mixture of such gas and nitrogen or air at a pressure of between atmospheric and about 100 pounds per square inch gauge, and preferably of about 45 to 50 psig. The pressure to be used will depend on required dielectric strength, control leakage and economy among other factors. Use of gas of this type for this purpose is well known as is disclosed in a number of patents including U.S. Pat. Nos. 2,867,679, 2,989,577, 3,231,662, 3,390,091 and 3,506,774.

According to this invention, conductor assembly 10 is field fabricated by securing the insulator spacers 40 in position to the conductor core 12 by means of an adhesive or the like, placing the staves 16 and 18 of sheath 14 around the conductor core and insulators, and welding or otherwise bonding the joints between the staves to secure the assembly. In fabricating a transmission line of considerable length, lengths of conductor core 12 may be butt welded at their ends, and sections of the sheath 14 may be joined by bushings or couplings in a conventional manner.

Expansion joints and gas barriers are provided in a conductor assembly of this invention spaced along the length thereof at intervals which depend on a number of factors such as cost, gas pressures to be employed, temperatures, and size of the conductor among others. As is well known, gas barriers permit incremental lengths of the conductor assembly to be progressively charged and minimize gas losses in the event of a leak. Expansion joints permit expansion and contraction of the assembly due to temperature changes without adverse affect on the assembly. Expansion joints are also well known, but have heretofore been required at much closer spacings than in a conductor assembly constructed in accordance with this invention which operates at low power losses and therefore at lower temperatures than prior art conductors. With this conductor, expansion joints may be spaced at 500 to 1,000 feet or more.

Any extraneous particles of conductive or metallic material in the conductor assembly 10 can be collected in trap 20 by charging conductor 12 and sheath 10 with a direct current and gradually increasing the voltage to produce an electric field which will activate the particles and cause them to travel back and forth in the annular space between the conductor core and sheath. As is explained in U.S. Pat. No. 3,515,939, a particle trap such as trap 20 in sheath 14 will have a zero or very low intensity field in the bottom and especially the corners of the trap and particles will eventually find their way into the trap and will remain there due to the low field intensity in the trap. An adhesive such as silicon grease may be provided in the bottom of the trap to insure that the particles which find their way into the trap will stick to the adhesive and not escape back into the sheath.

To remove non-metallic particles from the conductor assembly the conductor core 12 and sheath are charged with alternating current and the voltage gradually increased to activate the non-metallic or non-conductive particles so that they will eventually find their way into particle trap 20. The non-conductive particles are also trapped in the area of zero or low electrical field intensification and in the adhesive in the bottom of the particle trap so that the non-conductive materials also do not again escape into the annular space between the conductor core and sheath.

It is seen that an improved conductor assembly has been provided which includes a core conductor and a hollow sheath concentric about the core conductor and spaced therefrom by means of dielectric spacer insulators. Compressed gas in the sheath insulates the core conductor from the sheath. The sheath comprises a plurality of elongate staves having a tongue and groove engagement therebetween and a weld along the joint between the staves exteriorly of the tongue and groove engagement so that any splatter from the welding process will not enter the hollow sheath and contaminate it.

Although a preferred embodiment of a conductor assembly has been illustrated and described, it will be apparent to those skilled in the art that numerous modifications can be made in the details of the assembly without departing from the scope of the invention or of the appended claims. For example, the sheath in a conductor assembly may include any number of staves forming the circumference of the sheath, and as few as one stave which could be partially reshaped in the field to close it around the conductor core and insulators. The particle trap could also have various shapes or forms as could the spacer insulators in the assembly. The core conductor may also be tubular or hollow, particularly if the conductor assembly is to be used to carry alternating current.

What is claimed is:

1. A conductor assembly for transmission of high voltage electrical power comprising a hollow cylindrical metal sheath, a core conductor, a plurality of insulators in the sheath at spaced intervals along the length thereof supporting the core substantially concentrically centered in the sheath, and compressed insulating gas in the sheath, said sheath comprising one or more elongate staves each of which comprises a portion of the circumference of the sheath and having a groove along one longitudinal edge thereof open toward the adjoining edge of the adjacent stave and a tongue along the other longitudinal edge projecting into the groove in the adjoining edge of the adjacent stave and the staves welded together along their adjacent longitudinal edges exteriorly of said tongue and groove engagement so that welding will not contaminate the interior of the sheath, and further having a particle trap in the interior surface of said sheath comprising a longitudinally extending upwardly open groove in the bottom of the sheath as disposed for use in the transmission of electrical power.

2. A conductor as set forth in claim 1 in which said upwardly open groove has a trapezoidal cross section with the mouth of the groove being substantially narrower than the bottom of the groove.

3. A conductor as set forth in claim 2 in which said groove has an adhesive in it to catch and trap particles in the groove.

4. A conductor as set forth in claim 2 in which said groove is formed by adjacent longitudinally extending edge surfaces of adjoining staves.

5. A conductor as set forth in claim 1 in which two staves for the circumference of a section of said sheath and a plurality of such sections are joined end-to-end to form a transmission line.

6. A conductor as set forth in claim 1 in which said core conductor is a solid cylinder made of aluminum conductor alloy and has a dielectric coating on it.

7. A conductor as set forth in claim 1 in which said insulators are spaced apart at intervals of approximately 10 to 20 feet.

8. A conductor as set forth in claim 1 in which said compressed gas includes sulfur hexafluoride (SF6).

9. A conductor as set forth in claim 1, in which the longitudinal electrical conductance of the sheath is in the range of one to one-fifth of conductance of said core conductor.

* * * * *